United States Patent [19]
Chiba

[11] Patent Number: 5,523,990
[45] Date of Patent: Jun. 4, 1996

[54] APPARATUS FOR USING WINDOW SIGNAL GENERATORS TO ENABLE DETECTION OF HEATER INFORMATION SUCH AS AN ADDRESS MARK, SECTOR MARK, OR ADDRESS INFORMATION RECORDED ON EACH SECTOR OF A DISC RECORDING MEDIUM ONLY WHERE SUCH INFORMATION COULD BE PRESENT

[75] Inventor: Takayoshi Chiba, Tokyo, Japan

[73] Assignee: Sony Corporation, Tokyo, Japan

[21] Appl. No.: 222,970

[22] Filed: Apr. 5, 1994

Related U.S. Application Data

[62] Division of Ser. No. 983,646, Dec. 1, 1992, Pat. No. 5,353,175.

[30] Foreign Application Priority Data

Dec. 6, 1991 [JP] Japan ................... 3-322233

[51] Int. Cl.$^6$ ..................................... G11B 5/09
[52] U.S. Cl. ................................ 369/48; 360/48
[58] Field of Search ..................... 360/48, 40, 46, 360/49, 51, 43, 45; 369/32, 44.26, 48, 54, 58, 59

[56] References Cited

U.S. PATENT DOCUMENTS

| | | | |
|---|---|---|---|
| 3,794,987 | 2/1974 | Walenta | 360/43 |
| 4,271,519 | 6/1981 | Hall | 371/40.1 |
| 4,345,280 | 8/1982 | Blagaila et al. | 360/49 |
| 4,618,898 | 10/1986 | Young et al. | 360/51 |
| 4,625,321 | 11/1986 | Pechar et al. | 375/116 |
| 4,663,752 | 5/1987 | Kakuse et al. | 369/48 |
| 4,746,997 | 5/1988 | Shrinkle et al. | 360/49 |
| 4,802,169 | 1/1989 | Suzuki et al. | 371/37.2 |
| 5,012,460 | 4/1991 | Popovich et al. | 369/32 |
| 5,047,877 | 9/1991 | Herting | 360/51 |
| 5,068,753 | 11/1991 | Kanegae | 360/46 |
| 5,083,303 | 1/1992 | Yanagida et al. | 369/48 |
| 5,121,262 | 6/1992 | Squires et al. | 360/46 |
| 5,163,003 | 11/1992 | Kimura | 360/45 |
| 5,212,677 | 5/1993 | Shimonte et al. | 369/58 |
| 5,231,545 | 7/1993 | Gold | 360/49 |
| 5,255,131 | 10/1993 | Coker et al. | 360/48 |
| 5,267,097 | 11/1993 | Ogino et al. | 360/49 |
| 5,353,175 | 10/1994 | Chiba | 360/48 |
| 5,444,685 | 8/1995 | Masood et al. | 369/54 X |
| 5,446,604 | 8/1995 | Chiba | 360/48 X |

*Primary Examiner*—Georgia Y. Epps
*Assistant Examiner*—P. W. Huber
*Attorney, Agent, or Firm*—Limbach & Limbach; Philip M. Shaw, Jr.

[57] ABSTRACT

An improved apparatus for detecting address information recorded on a recording medium such as an optical-magnetic disc is disclosed. The header information is recorded on each sector of the disc recording medium and is constituted by a sector mark indicating a head position of the corresponding sector, a plurality of address marks, and subsequent address information data. In a first preferred embodiment, a number of bytes starting from an end position of the address information and ending at a head position of the address information is counted and an address information recognition circuit is provided so as to provide an address information recognition start signal for the address information recognition signal at a predicted position of the head position. The address information recognition circuit extracts and recognizes the address information in accordance with the address information recognition start signal supplied from a recognition start signal generator when the address mark detecting circuit does not supply a head position detection signal. In a second preferred embodiment, a window signal used to detect the address mark is selectively changed according to the result of detection of the preceded sector mark and/or address information data.

3 Claims, 10 Drawing Sheets

FIG.7

| SECTOR MARK | WINDOW 1 | AD1 | WINDOW 2 |
|---|---|---|---|
| X (NOT DETECTED) | W1 | X (NOT DETECTED) | W1 |
| O (DETECTED) | W2 | X | W2 |
| X | W1 | O (DETECTED) | W3 |
| O | W2 | O | W3 |

FIG.9

| SECTOR MARK | WINDOW 1 | AD1 | WINDOW 2 | AD2 | WINDOW 3 |
|---|---|---|---|---|---|
| X (NOT DETECTED) | W1 | X (NOT DETECTED) | W1 | X (NOT DETECTED) | W1 |
| X | W1 | X | W3 | O | W3 |
| X | W1 | O (DETECTED) | W3 | X | W3 |
| X | W1 | O | W2 | O | W2 |
| O (DETECTED) | W2 | X | W2 | X | W3 |
| O | W2 | O | W3 | O | W3 |
| O | W2 | O | W3 | X | W3 |
| O | W2 | | | O | W3 |

APPARATUS FOR USING WINDOW SIGNAL GENERATORS TO ENABLE DETECTION OF HEATER INFORMATION SUCH AS AN ADDRESS MARK, SECTOR MARK, OR ADDRESS INFORMATION RECORDED ON EACH SECTOR OF A DISC RECORDING MEDIUM ONLY WHERE SUCH INFORMATION COULD BE PRESENT

This is a divisional of application Ser. No. 07/983,646, filed Dec. 1, 1992, now U.S. Pat. No. 5,353,175.

BACKGROUND OF THE INVENTION

1. Field of The Invention

The present invention relates generally to an apparatus for detecting header information recorded on a header of each sector for a magnetic disc recording medium.

2. Description of The Background Art

Generally, on a disc recording medium such as an optical-magnetic disc, each sector includes a header portion and a data region. The header is constituted by an address mark and address information such as a track number and sector number. A head position of the address information is identified by an address mark.

For example, to improve the information reliability, the address information (data) are recorded in plural on each header of the optical-magnetic disc.

FIG. 1 shows an example of recording the address information on two parts of each header.

In FIG. 1, a first sector 1 is constituted by the header HD (HD1) and data region DA (DA1). The header HD1 is constituted by a sector mark M, an address mark AM1, an address information data AD1 whose head position is indicated by the address mark AM1, an address mark AM2 which is separated by a predetermined number of bytes from an end position of the address information data AD1, and address information data AD2 whose head position is indicated by the address mark AM2. The address information data AD1 have the same content as that of the address information data AD2.

Then, a previously proposed header information detecting apparatus starts a data read operation upon detection of at least one of the address information data AD1 or AD2 at a time of, for example, a data reading.

On the other hand, when data is to be written, the header information detecting apparatus starts a data write operation only upon the detection of both address information data AD1 and AD2.

However, in the previously proposed header information detecting apparatus, it is not possible to detect a start position of the subsequent address information data AD2 since the start position cannot be identified in a case when, for example, a slight defect or irregularity occurs on the address mark AM2. Therefore, the previously proposed header information detecting apparatus cannot carry out the write operation even though no defect is present on the address mark AM1, address information data AD1 and AD2.

Referring to FIG. 2, in another, a previously proposed sector mark detector of the header information detecting apparatus detects the sector mark M and, thereafter, a count of a number of bytes is started upon detection of the sector mark M.

When the counted number of bytes reaches a number corresponding to a head position of the address mark AM1, a previously proposed window signal generator thereof generates a window signal which provides an open state (usually at an "H (high)" level) for a predetermined interval of time (corresponding to a fixed window time width). The window signal which is in the open state is supplied to a previously proposed address mark detector to initiate the detection of the address mark AM1. When the address mark AM1 is detected, the address information data AD1 is read on the basis of the detected address mark AM1. Next, when the counted number of bytes reaches the number corresponding to the head position of the address mark AM2, the detection of the address mark AM2 is initiated in accordance with the window signal derived from the window signal generator. When the address mark AM2 is detected, the address information data AD2 is read on the basis of the detected address mark AM2.

In this way, in the previously proposed address mark detector, the detection operation of the address mark is controlled in accordance with the window signal.

The previously proposed address mark detector fixes the time width of the window signal which is in the open state to a marginal width wider than a width of data in which the address mark can be present, with a time axis deviation between the window signal and address mark when the sector mark cannot be detected taken into consideration.

However, if the time width during which the window signal is in the open state is wider than the width of data in which the address mark can be present, a possibility of erroneously recognizing the address mark becomes increased. If the address mark is erroneously recognized, a correct recognition of the address information cannot be made in the previously proposed header information detecting apparatus and the accuracy of reading the data on the magnetic recording medium can be reduced.

SUMMARY OF THE INVENTION

It is, therefore, a principal object of the present invention to provide an improved apparatus for accurately detecting header information such as an address mark, sector mark, and/or address information data for each of sectors on a disc recording medium.

The above-described object can be achieved by providing an apparatus for detecting header information of a plurality of sectors recorded on a disc recording medium, the header information being recorded on each sector of the disc recording medium and being constituted by a sector mark indicating a head position of the corresponding sector, a plurality of address marks and address information data, said apparatus comprising: a) sector mark detecting means for detecting the sector mark of each sector and outputting a sector mark detection signal when detecting the sector mark; b) first window signal generating means for generating a first window signal which is in an open state when a predicted head position of the sector mark is reached and which is in a closed state when receiving the sector mark detection signal; c) address information data detecting means for detecting the address information data from the header of each sector and outputting an address information detection signal when detecting the address information data; d) second window signal generating means for generating a second window signal which is in the open state when the predicted head position of the sector mark is reached and which is in the closed state when receiving the address information detection signal; and e) third window signal generating means for generating a third window signal which is in the open state only when both first and second window signals are received thereto, the detection of the sector mark by means of the sector mark detecting means being enabled only when the third window signal is in the open state.

The above-described object can also be achieved by providing an apparatus for detecting header information of a plurality of sectors recorded on a disc recording medium, the header information being recorded on each sector of the disc recording medium and being constituted by a sector mark indicating a head position of the corresponding sector, a plurality of address marks and address information data, said apparatus comprising: a) sector mark detecting means for detecting the sector mark of each sector and outputting a sector mark detection signal when detecting the sector mark; b) address mark detecting means for detecting each address mark; c) address information data detecting means for detecting each address information data on the basis of the detected address mark and outputting a detection signal indicating that the address information data is detected; d) plural window signals generating means for generating a plurality of window signals whose time widths in their open states are different from one another; and e) window signal selecting means for selectively outputting one of the window signals to the address mark detecting means such that when the sector mark is detected, one of the window signals whose time width is relatively narrower than any other window signals is selected and when the address information data is also detected, one of the window signals whose time width in the open state is narrower than any other window signals is selected, said address mark detecting means executing the detection operation of the address mark only when the selected window signal is in the open state.

The above-desribed object can also be achieved by providing an apparatus for detecting header information of a plurality of sectors recorded on a disc recording medium, the header information being recorded on each sector of the disc recording medium and being constituted by a sector mark indicating a head position of the corresponding sector, a plurality of address marks and address information data, said apparatus comprising: a) address mark detecting means for detecting each address mark of each sector and outputting a head position detection signal indicating a head position of the address information subsequent to the address mark; b) address information data recognizing means for extracting and recognizing the address information data on the basis of the received head position detection signal and outputting an end position detection signal indicating an end position of the address information data; and c) recognition start signal generating means for counting a predetermined number of bytes on the header from a point of the end position of the preceded address information data to a point of the head position of the subsequent address information data and for outputting an address information data recognition start signal to the address information data recognizing means when a predicted position of the head position is reached, said address information data recognizing means extracting and recognizing the address information data in accordance with the address information data recognition start signal from the recognition start signal generating means when the head position detection signal is not supplied to the address mark detecting means.

BRIEF DESCRIPTION OF THE DRAWINGS

FIG. 7 is a table listing selections of the window signals in case of the second preferred embodiment shown in FIG. 5.

FIG. 9 is a table listing selections of the window signals in the case of the third preferred embodiment according to the present invention.

DESCRIPTION OF THE PREFERRED EMBODIMENTS

Reference will, hereinafter, be made to the drawings in order to facilitate a better understanding of the present invention.

Figure 1:
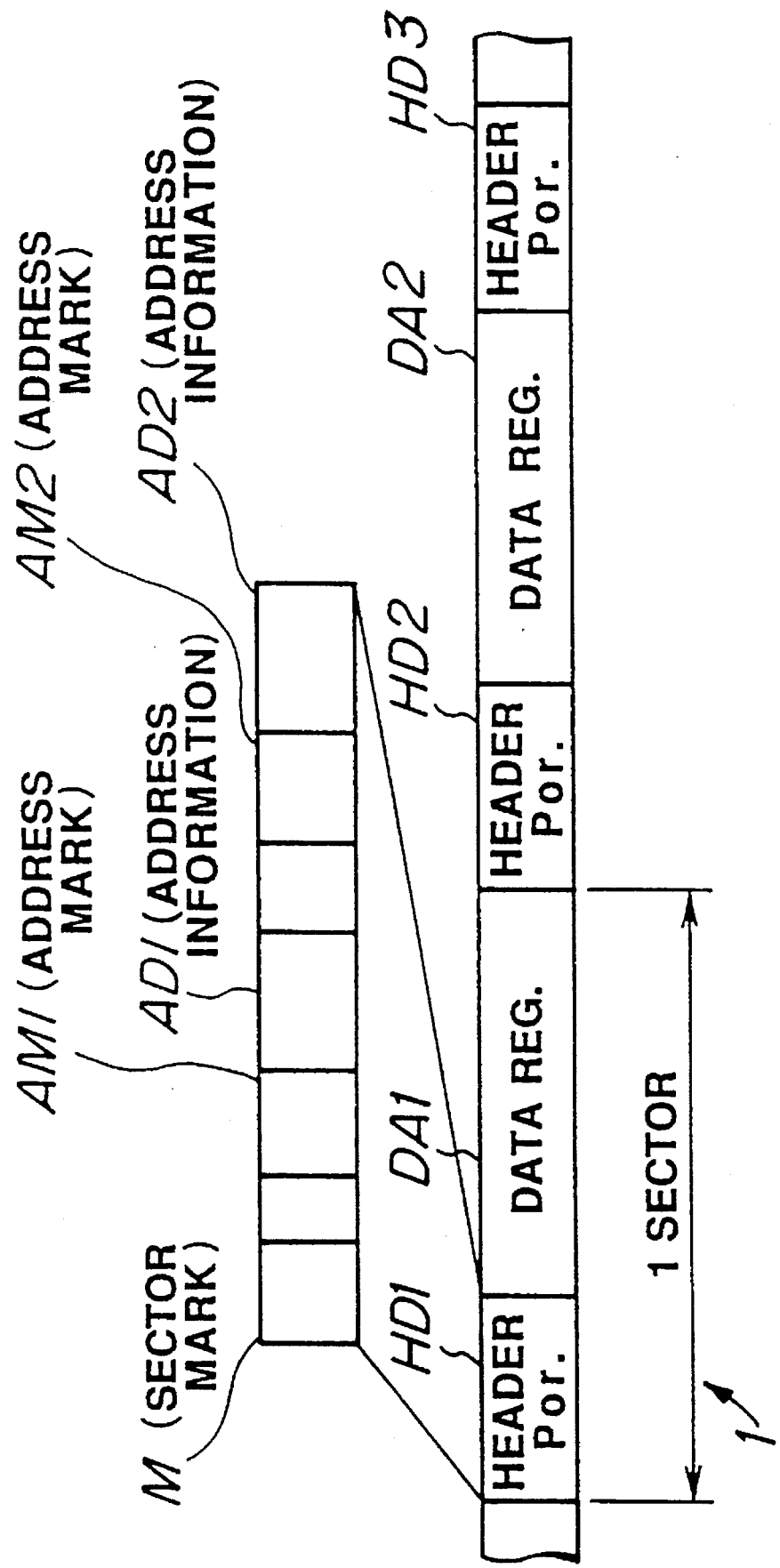
FIG. 1 is an explanatory view of an example wherein a plurality of address information data are recorded on a header of a sector of a recording medium explained in the BACKGROUND OF THE INVENTION.
Figure 2:
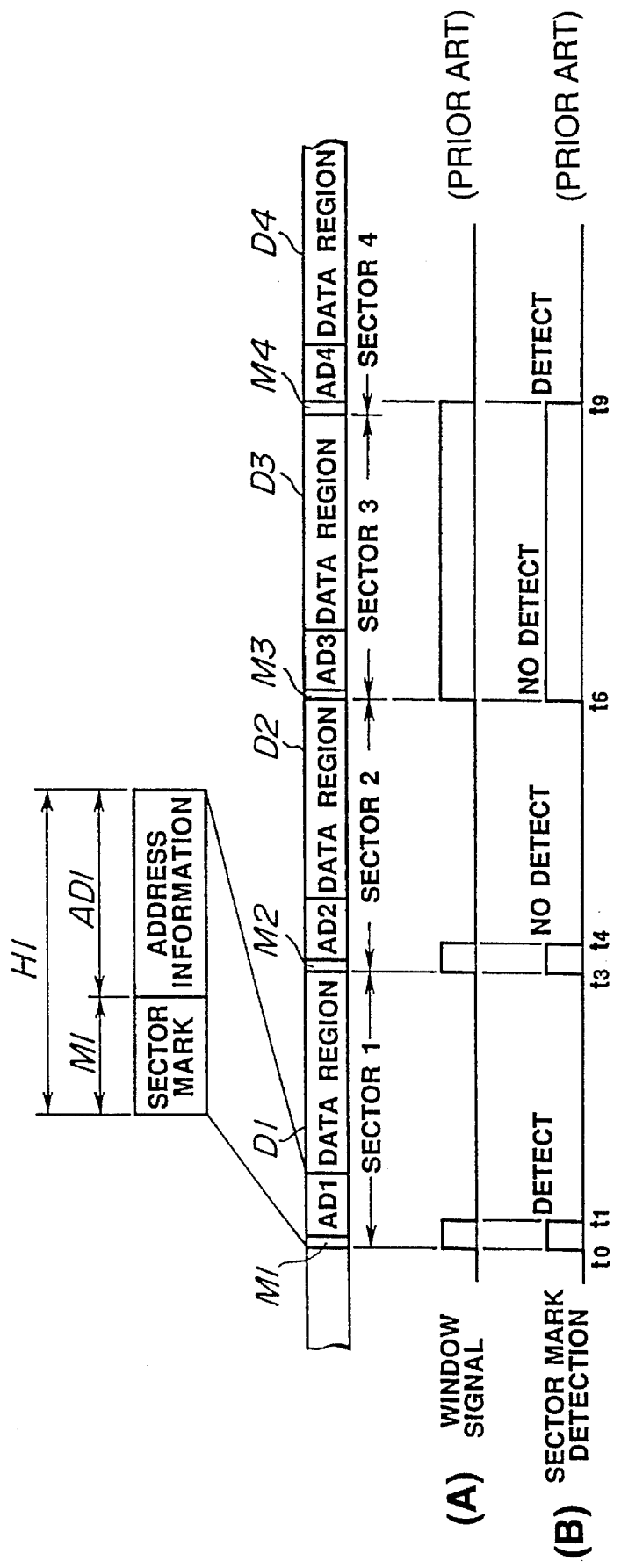
FIG. 2 is an explanatory view of an example wherein the plurality of address information data are recorded on headers of respective sectors explained in the BACKGROUND OF THE INVENTION.

FIGS. 1 and 2 are already explained in the BACKGROUND OF THE INVENTION.

First Preferred Embodiment

Figure 3:
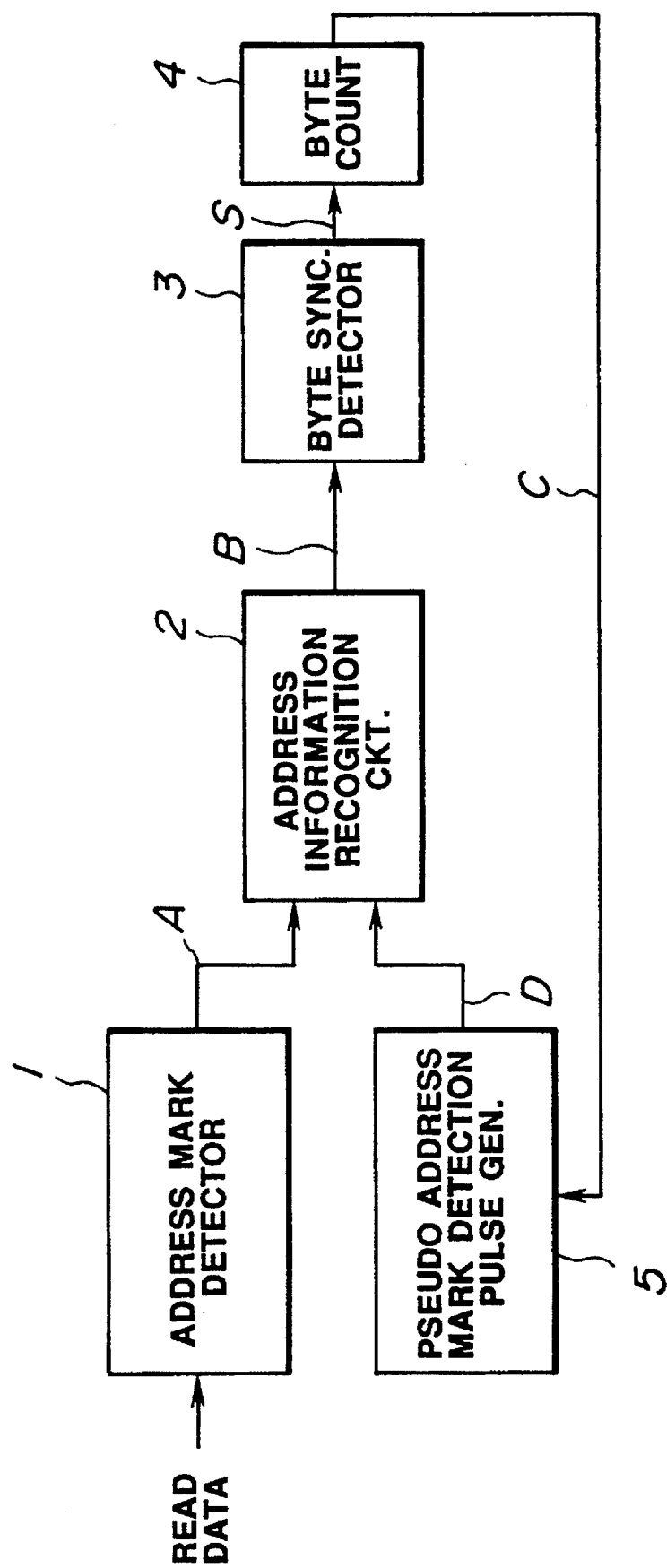
FIG. 3 is a circuit block diagram of a first preferred embodiment of a header information detecting apparatus according to the present invention.

FIG. 3 shows a circuit block diagram of a first preferred embodiment of an apparatus for detecting a header information applicable to a detection of address information on an optical-magnetic disc.

In FIG. 3, an address mark detector 1 detects an address mark from data (read data) read from an optical-magnetic disc (not shown) and outputs a detection pulse signal A when detecting the address mark.

An address information recognition circuit 2 identifies a head position of the address information on the basis of the detection pulse signal A or a pseudo pulse signal D as will be described later, extracts and recognizes the address information, and supplies an end position signal B to a byte sync detector 3 connected to a byte counter 4. A pseudo address mark detection pulse generator 5 is supplied with a byte count start signal C output from the byte counter 4 and the pseudo pulse signal (address information recognition start signal) D to the address information recognition circuit 2.

Figure 4:
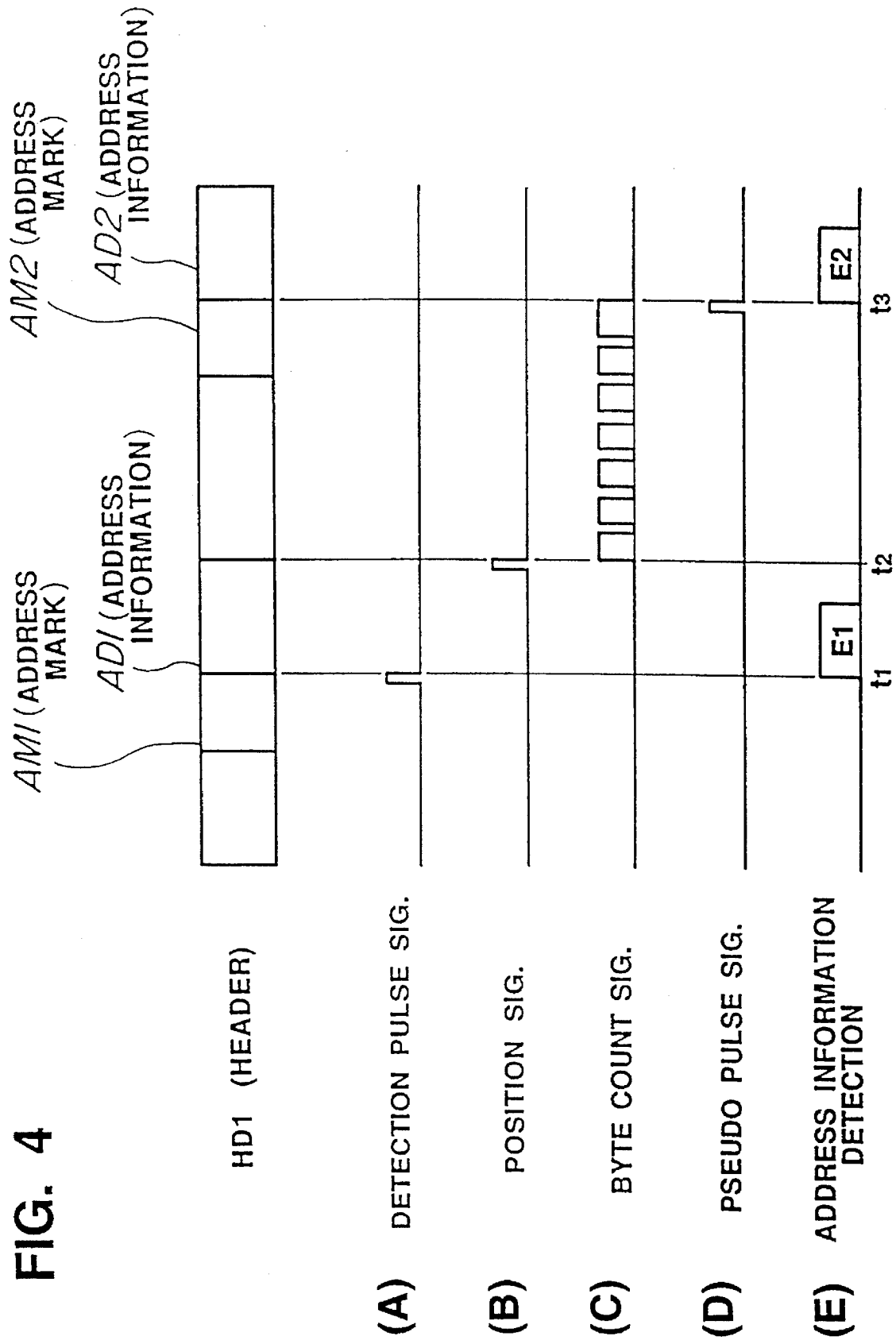
FIG. 4 is a timing chart for explaining an operation of the first preferred embodiment of the header information detecting apparatus shown in FIG. 3.

FIG. 4 shows an operation timing chart for explaining the operation of the first embodiment shown in FIG. 3.

An preceded address mark AM1 of a header HD1, as shown in FIG. 4 is detected by the address mark detector 1. The address mark detector 1 supplies, then, the detection pulse signal A, i.e., a signal indicating the head position of the address information AD1 to the address information recognition circuit 2. The address information recognition circuit 2, upon receipt of the detection pulse signal A, starts the extraction and recognition of the address information AD1 at a time of $t_1$ and derives the detection information E1. The address information recognition circuit 2 supplies an end position signal B indicating an end position of the address information AD1 to the byte synchronization detector 3. The byte synchronization detector 3, upon receipt of the end position signal B, supplies a byte count start signal S to the byte counter 4 at an end time of $t_2$ at which the address information is ended.

Then, the byte counter 4 supplies the byte count signal C at the time of $t_2$ to the pseudo address mark detection pulse generator 5. The detection pulse generator 5 supplies the pseudo pulse D when the byte count signal C from the byte counter 4 indicates a predetermined value, in other words, when the byte count signal C indicates a predetermined number of bytes (in the example shown in FIG. 4, seven bytes) starting from the end position of the address information data AD1 to the head position subsequent to the address information data AD2. The pseudo pulse signal D indicates a predicted position of the head position of the address information data AD2.

In the first embodiment, when no defect in the subsequent address mark AM2 is present, the address mark detector 1 detects the address mark AM2, supplying the detection pulse signal A indicating the head position of the address information data AD2 to the address information recognition circuit 2. Then, the address information data AD2 are extracted and recognized.

On the other hand, if a defect is present in the address mark AM2 and the head position of the address information AD2 is not recognized, the detection pulse signal A is not derived from the address mark detector 1. In this case, the extraction and recognition of the address information data AD2 are started at the time of $t_3$ on the basis of the pseudo pulse signal D derived from the pseudo address mark detection pulse signal generator 5 to derive the detection information E2.

In the first embodiment, the address information recorded on the single header is constituted by two address information data AD1 and AD2. However, the present invention is applicable to a case where three or more address information data are recorded on the single header.

It is noted that although the header information detecting apparatus in the first embodiment is applicable to the detection of the address information on the optical-magnetic disc, the present invention is also applicable to the detection of the address information on another magnetic disc.

Second Preferred Embodiment

Figure 5:
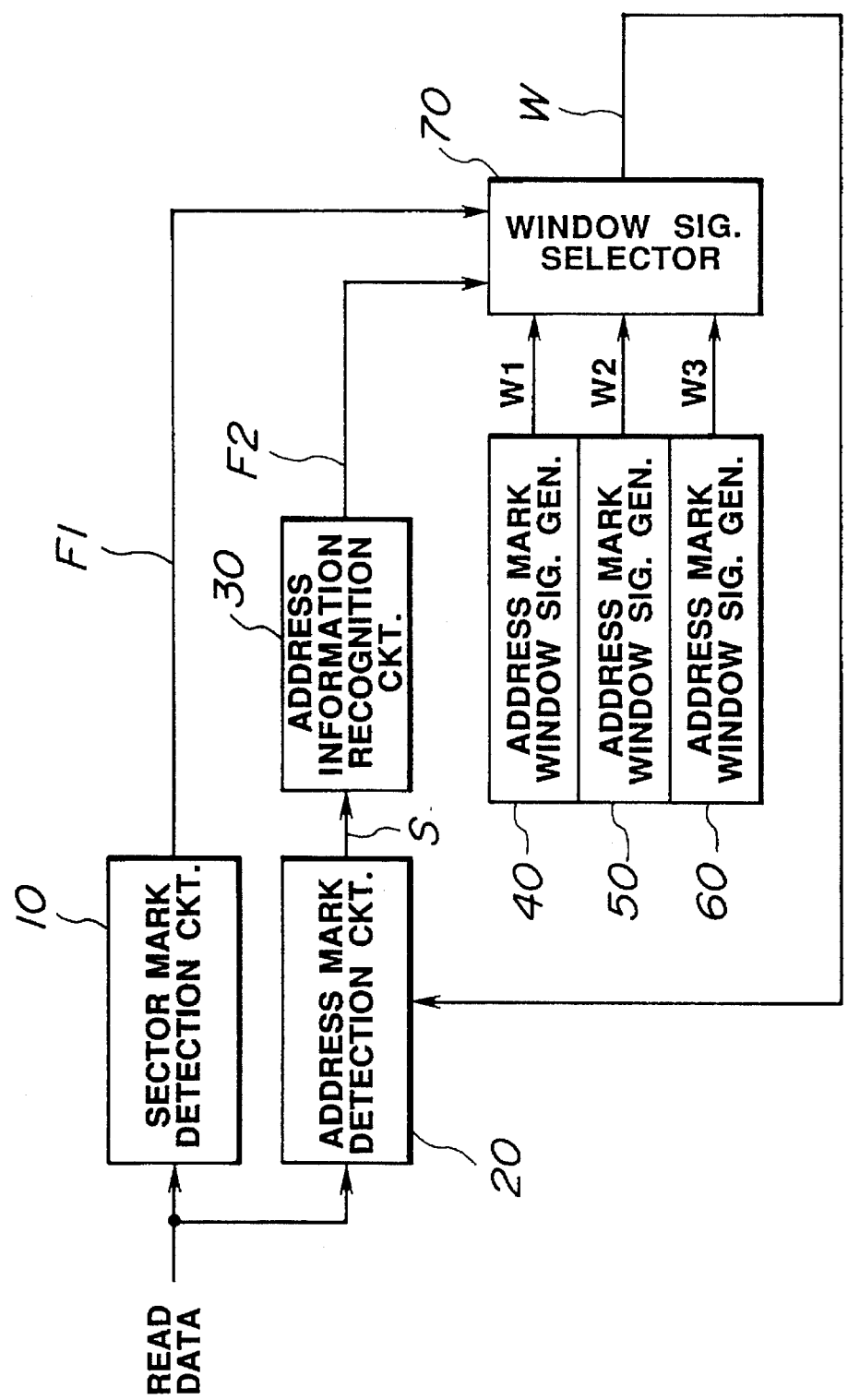
FIG. 5 is a circuit block diagram of a second preferred embodiment of the header information detecting apparatus according to the present invention.

FIG. 5 shows a circuit block diagram of a second preferred embodiment of the header information detecting apparatus according to the present invention.

In the second embodiment shown in FIG. 5, a sector mark detector 10 detects the sector mark from the read data on the optical-magnetic disc (not shown) and outputs a flag signal F1 of an "H" level when detecting the sector mark.

The address mark detector 20 detects the address mark from the read data in accordance with an address mark window signal W as will be described later and outputs the detection signal S when detecting the address mark. The address information recognition circuit 30 functions as that denoted by 2 in FIG. 3 of the first embodiment. The address information recognition circuit 30 outputs a flag signal F2 of the "H" level when the recognition of the address information data is ended.

Three parallel address mark window signal generators 40, 50, and 60 are disposed in the header information detecting apparatus of FIG. 5.

The address mark window signal generator 40 generates the window signal W1 which indicates an open state (enabling state) having a maximum window time width. The window signal generator 50 generates the window signal W2 which indicates an open state having a window time width narrower than that of the window signal W1. The window signal generator 60 generates the window signal W3 which indicates an open state having a window time width narrower than that of the window signal W2. A window signal selector 70 selects one of the three window signals W1, W2, and W3 derived from the window signal generators 40, 50, and 60 on the basis of the flag signals F1 and F2 and outputs the selected window signal to the address mark detector 20 as the address mark window signal W.

Figure 6:
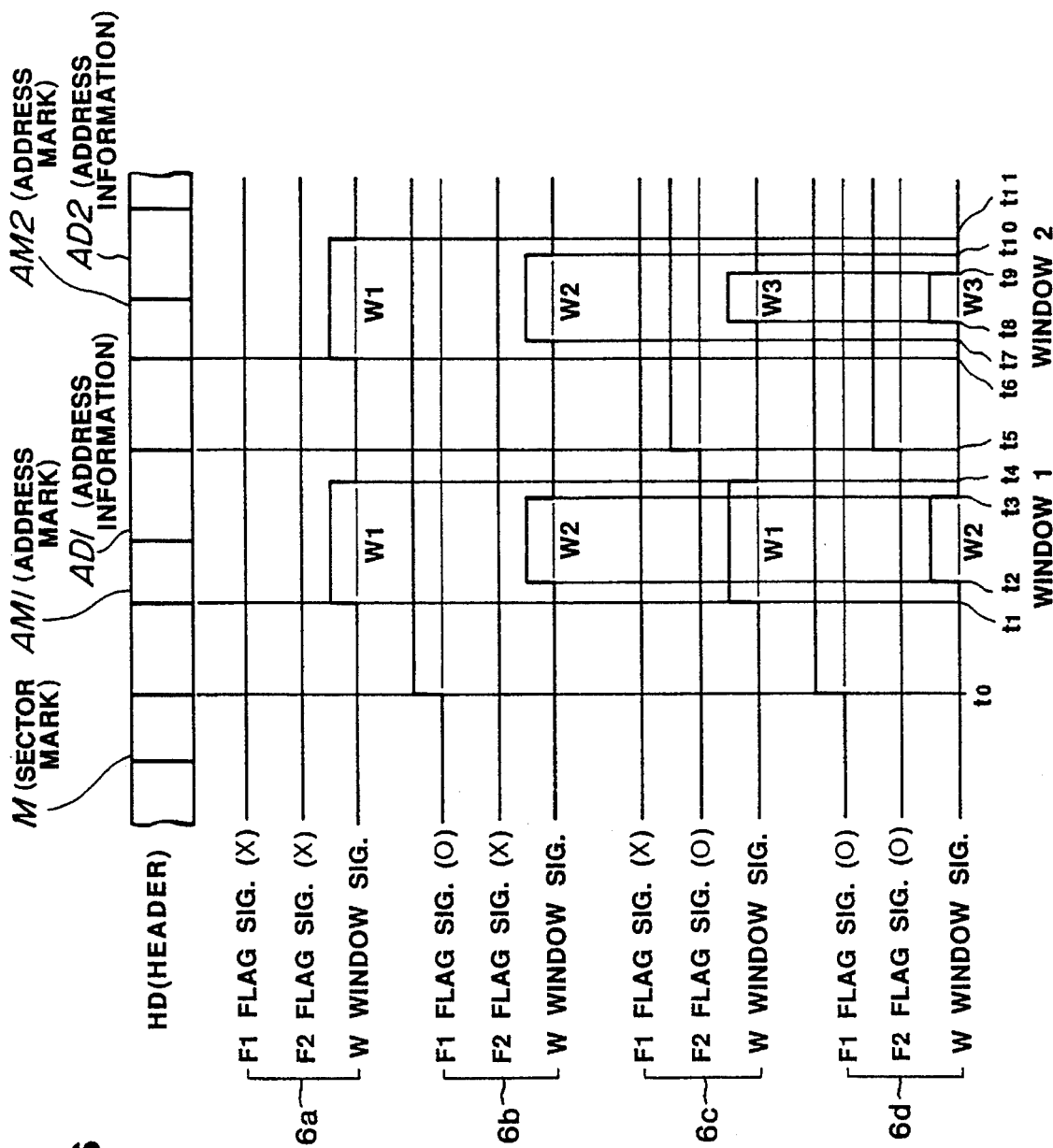
FIG. 6 is a timing chart for explaining the operation of the second preferred embodiment shown in FIG. 5.

FIG. 6 shows a timing charts of the address mark detection operation in the second embodiment shown in FIG. 5 in a case where two address marks AM1, AM2 and two address information data AD1 and AD2 are recorded on the optical-magnetic disc.

Waveforms 6a show the case where neither the sector mark M nor address information data AD1 are detected (a symbol X denotes the case of no detection thereof).

Since the sector mark detector 10 cannot detect the sector mark M, the flag signal F1 indicates an "L" level.

In this case, the window signal selector 70 selects the window signal W1 as a window 1 so that the detection operation of the address mark AM1 is enabled during the time of $t_1$ to the time of $t_4$. Next, since the address information recognition circuit 30 cannot detect the address information data AD1, the flag signal F2 indicates the "L" level. In this case, the selector 70 selects the window signal W1 as the window 2 so that the detection operation of the address mark AM2 is enabled during a time of $t_6$ to a time of $t_{11}$.

Waveforms 6b show the case where the sector mark M has been detected (a symbol O denotes the case of can be detected) but the address information data AD1 are not detected.

Since the sector mark M is detected, the flag F1 indicates the "H" level after the time of $t_0$.

In this case, the window signal W2 is selected as the window 1 so that the detection operation of the address mark AM1 is enabled during the time $t_2$ to the time $t_3$. Next, since the address information data AD1 have not been detected, the flag signal F2 indicates the "L" level. In this case, the window signal W2 is selected as the window W2 so that the detection operation of the address mark AM2 is enabled during the time of $t_7$ to the time of $t_{10}$.

Waveforms 6c show the case where the sector mark M has not been detected but the address information data AD1 are detected.

Since the sector mark M is not detected, the flag signal F1 indicates the "L" level. In addition, the window signal W1 is selected as the window 1 so that the detection operation of the address mark AM1 is enabled during the time $t_1$ to the time $t_4$. Next, since the address information data AD1 are detected, the flag signal F2 indicates the "H" level after the time $t_5$. In this case, the window signal W3 is selected as the window 2 so that the detection operation of the address mark AM2 is enabled during the time $t_8$ to the time $t_9$.

Waveforms 6d show the case where both sector mark M and address information data AD1 are detected.

Since the sector mark M has been detected, the flag signal F1 indicates the "H" level after the time $t_0$.

In this case, the window signal W2 is selected as the window 1 so that the detection operation of the address mark AM1 is enabled during the time $t_2$ to the time $t_3$. Next, since the address information data AD1 are also detected, the flag signal F2 indicates the "H" level after the time $t_5$. In this case, the window signal 2 is selected as the window W3 so that the detection operation of the address mark AM2 is enabled during the time $t_8$ to the time $t_9$.

FIG. 7 shows a table indicating which window signals are selected according to the presence or absence in the sector mark M and address information data AD1 in the case of the second embodiment shown in FIGS. 5 through 6.

As shown in FIG. 7, in the case where the sector mark M is not detected, the window signal W1 is selected as the window 1 and in the case where the sector mark M is detected, the window signal W2 is selected. In the case where the address information data AD1 is not detected, the window signal, the same as the window 1, is selected as the window 2. In the case where the address information data AD1 data are detected, the window signal W3 is selected as the window 2.

As described above, in the second embodiment, the window signal W1 is selected which has the maximum window time width as the address mark AM1 detection window 1 and, in the case where the sector mark M is not detected, the window signal W2 is selected which has a time width narrower than that of the window signal W1.

Furthermore, in a case where the address information data AD1 are not detected, the window signal, the same as the window W1, is selected as the address mark AM2 detection window 2, and, in the case where the address information data AD1 are detected, the window signal W3 is selected which has a time width narrower than that of the window signal W2 is selected as the window 2.

Hence, the apparatus can determine whether a time synchronization between the optical-magnetic disc and detecting apparatus can accurately be taken according to a detection situation of the sector mark and address information and can reduce the possibility of erroneous recognition of the address mark with the open time width of the address mark detection window signal reduced.

Consequently, the accuracy of reading the data from the optical-magnetic disc recording medium can be remarkably improved.

Third Preferred Embodiment

Figure 8:
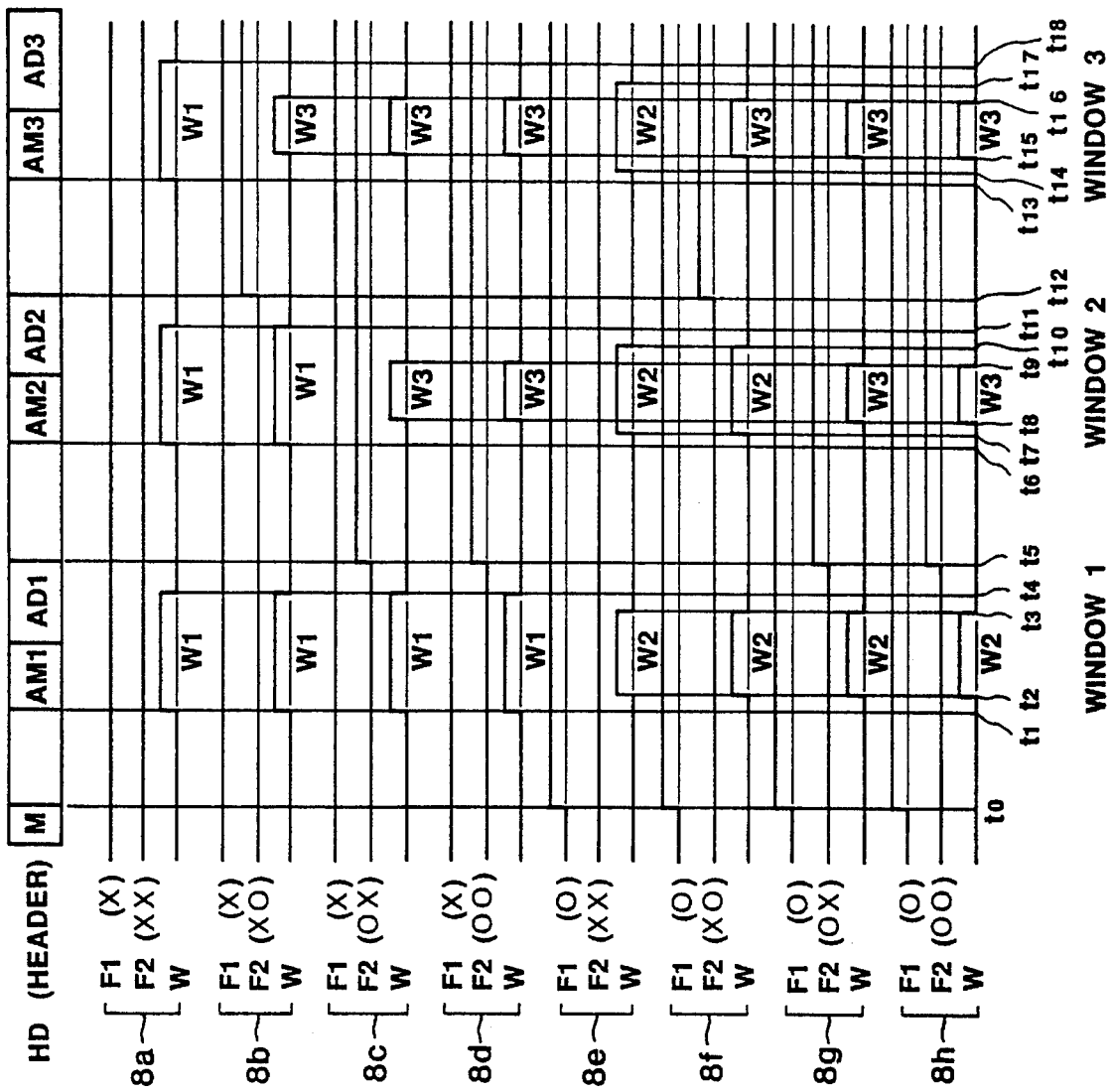
FIG. 8 is a timing chart for explaining the operation in a third preferred embodiment of the header information detecting apparatus according to the present invention.

FIG. 8 shows timing charts of an operation of a third preferred embodiment of the header information detecting apparatus according to the present invention.

The third embodiment has the same structure as the second embodiment shown in FIG. 5 but is applicable to the detecting apparatus for the header HD on which three address marks AM1, AM2, and AM3 and three address information data are recorded.

FIG. 9 shows the table listing which window signal is selected according to the presence or absence of the sector mark and address information data AD1 and AD2.

In addition, waveforms 8a, 8b, 8c, and 8d show the case where the sector mark M is not detected.

In this case, the window signal W1 which is in the open state during the time duration from the time $t_1$ to the time $t_4$ is selected as window 1.

FIGS. 8 (E) through 8 (H) show the case where the sector mark M is detected.

In this case, the window signal W2 is selected as the window 1 and is in the open state during the time duration from the time $t_2$ to the time $t_3$.

In the case where the address information AD1 is not detected as in the case of waveforms 8a, 8b, 8e, and 8f, the same window signal as that selected as the window 1 is selected for the window 2.

In the case where the address information data AD1 are detected as in the case of waveform 8c, 8d, 8g, and 8h, the window signal W3 is selected as the window 2.

Next, in the case where the address information data AD2 are not detected as in the case of waveforms 8c, 8g, 8e, and 8g, the same window signal as that selected as the window 2 is selected as the window 3. In details, in the case of waveforms 8a, the window signal W1 is selected which is in the open state during the time duration from the time $t_{13}$ to the time $t_{18}$. In the case of waveform 8e, the window signal W2 is selected which is in the open state during the time duration from the time $t_{14}$ to the time $t_{17}$. Furthermore, in the cases of waveforms 8c and 8g, the window signal W3 is selected which is in the open state during the time duration from the time $t_{15}$ to the time $t_{16}$.

In the case where the address information data AD2 are detected as in the cases of waveforms 8b, 8d, 8f, and 8h, the window signal W3 is selected which is in the open state during the time duration from the time $t_{15}$ to the time $t_{16}$.

As shown in FIG. 9, the third embodiment of the header information detecting apparatus is carried out as follows:

When the sector mark M is not detected, the window signal W1 is selected, which is in the open state having the maximum window time width, as the address mark AM1 detection window 1. When the sector mark M is detected, the window signal W2, which is in the open state whose time width is narrower than that of the window signal W1, is selected as the window 1.

In addition, in the case where the address information data AD1 are not detected, the window signal, the same as the window 1, is selected as the address mark AM2 detection window 2.

Then, in the case where the address information data AD1 are detected, the window signal W3 is selected, which is in the open state having the time width narrower than that of the window signal W2 as the window 2.

In the case where the address information data AD2 are not detected, the window signal, the same as the window 2, is selected as the address mark AM3 detection window 3.

In the case where the address information data AD2 are not detected, the window signal W3 is selected which is in the open state having the time width narrower than that of the window signal W2 as the window 3.

Hence, in the same way as in the second embodiment, the possibility of erroneously recognizing the address mark can be reduced and accuracy of reading the data from the optical-magnetic disc can be improved.

Fourth Preferred Embodiment

Figure 10:
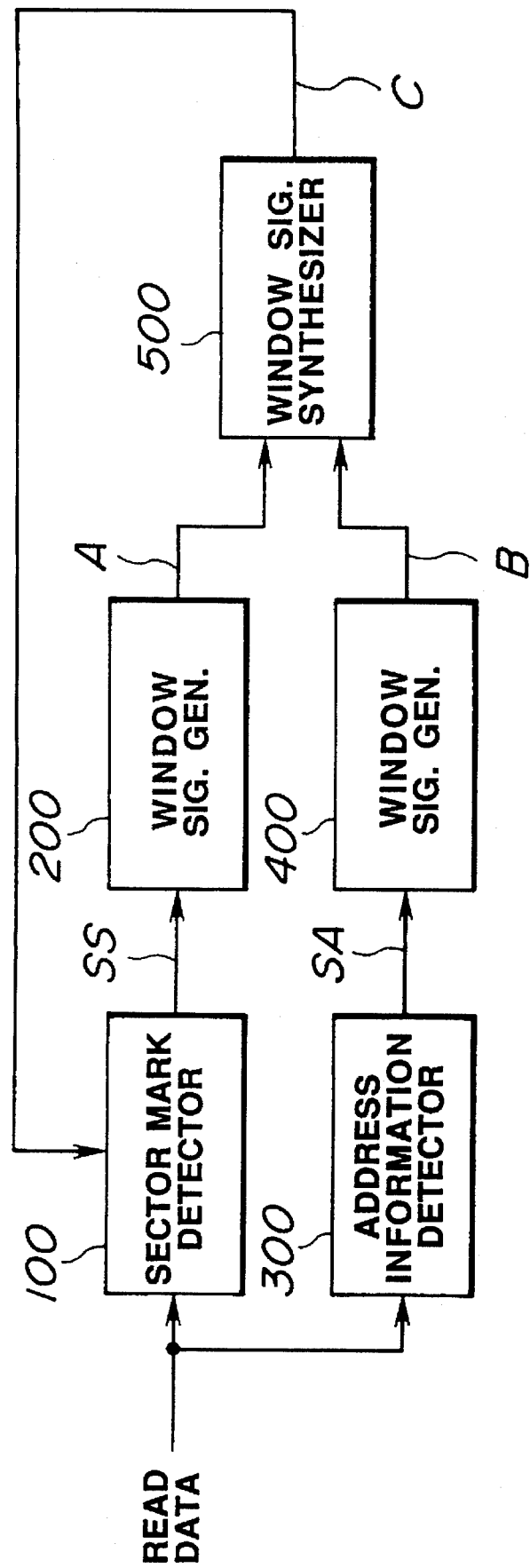
FIG. 10 is a circuit block diagram of a fourth preferred embodiment of the header information detecting apparatus according to the present invention.

FIG. 10 shows a circuit block diagram of a fourth preferred embodiment of the header information detecting apparatus according to the present invention.

As shown in FIG. 10, the header information detecting apparatus is applicable to the detection of the sector mark.

In FIG. 10, a sector mark detector 100 detects the sector mark from the read data and outputs the detection signal SS when detecting the sector mark.

Figure 11:
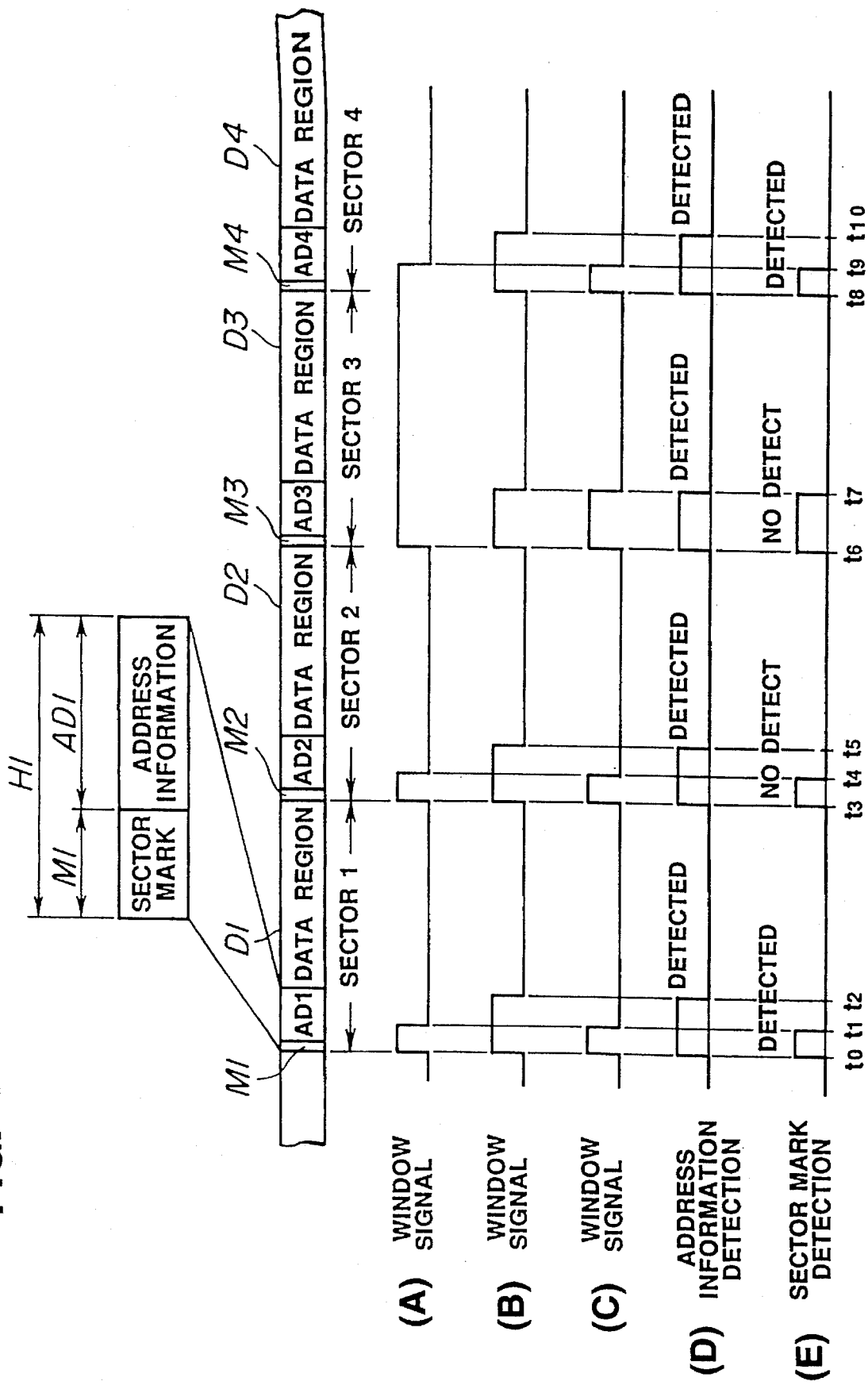
FIG. 11 is a timing chart with respect to sectors for explaining an operation of the fourth preferred embodiment of the header information detecting apparatus shown in FIG. 10.

A window signal generator 200 receives the detection signal SS and outputs a window signal A. The window signal A is shown in FIG. 11, i.e., which is in the "H" level (open state) when reaching a vicinity to a predicted head position of the sector mark and is set to the "L" level (closed state) on the basis of the received detection signal SS. The address information detector 300 detects the address information data of the header of each sector from the read data from the optical-magnetic disc and outputs a detection signals A when detecting the address information data thereof.

The other window signal generator 400 generates a window signal B which is in the open state ("H" level) and in the closed state ("L" level) in accordance with the detection signal SA.

A window signal synthesizer 500 is connected to both window signal generators 200 and 400.

The window signal synthesizer 500 synthesizes both the window signal A and the window signal B so as to generate a new window signal C so as to provide the "H" level only when both window signals A and B indicate the "H" levels. The window signal C is supplied to the sector mark detector 100 so that the sector mark detector 100 is enabled to detect the sector mark only when the window signal C is at the "H" level (open state).

FIG. 11 shows an operation timing chart in the case of the fourth embodiment of FIG. 10.

As shown in FIGS. 10 and 11, the window signal A from the window signal generator 200 is turned to the "H" level and the window signal B from the window signal generator 400 is turned to the "H" level in accordance with the detection signal SA from the address information detector 300, at the time of $t_0$.

At this time, the window signal C indicates the "H" level so as to enable the detection of the sector mark by means of the sector mark detector 100.

When the sector mark M1 is detected at the time of $t_1$, the counting of the byte number is initiated.

Then, the window signal A from the window signal generator 200 is turned to the "L" level in accordance with the detection signal SS. Then, the window signal C is also turned to the "L" level.

Thus, the sector mark detection operation of the sector mark detector 100 is disabled.

When the sector mark detection of the address information data is ended at the time of $t_2$, the window signal B is turned to the "L" level.

Next, at the time $t_3$, when the number of bytes reaches the number of bytes corresponding to the head position of the sector mark M2, both window signals A and B indicate the "H" levels and, accordingly, the window signal C also indicate the "H" level so that the sector mark M2 detection operation of the sector mark detector 100 is enabled. In a case where the sector mark M2 is not yet detected, the window signal A is turned to the "L" level at the time of $t_4$ which is predetermined time later from the time $t_3$. At the time of $t_4$, the window signal C is turned to the "L" level so that the sector mark detection is disabled. At the time of $t_5$ when the address information detection is ended, the window signal B is turned to the "L" level.

When the number of bytes reaches the number of bytes corresponding to the head position of the sector mark M3 at the time of $t_6$, both window signals A, B, and C indicate the "H" levels so that the detection of the sector mark M3 is enabled. If the sector mark M3 is not yet detected, the window signal A maintains its "H" level since both sector marks M2 and M3 are not continuously detected. On the other hand, if the detection of the address information data is ended at the time of $t_7$, the window signal B is turned to the "L" level and the window signal C is turned to the "L" level.

Hence, the detection operation of the sector mark is disabled at the time of $t_7$.

Furthermore, when the number of bytes reaches the number of bytes corresponding to the head position of the sector mark M4 at the time of $t_8$, the window signal B indicates the "H" level and window signal C also indicates the "H" level. Thus, the detection operation of the sector mark is enabled.

When the sector mark M4 is detected at the time of $t_{10}$, the window signal B is turned to the "L" level.

As described above, in the fourth embodiment, only when the window signal A is turned to the "H" level and the window signal B is turned to the "H" level (the window signal B is turned to the "H" level during the detection operation of the address information data), the sector mark detection operation is enabled. Therefore, even when the sector marks are not continuously detected, the sector mark detection operation is executed only in a range of time in which the sector mark can be present. In this way the situation wherein the other data in the region in which the sector mark cannot be present are erroneously recognized as the sector mark can be avoided. Consequently, the accuracy of reading the data from the optical-magnetic disc can be improved.

Effects Achieved by the Present Invention

In the first embodiment, the following features are provided: the address mark detecting means for detecting the address mark from the header and outputting the head position detection signal indicating the head position of the address information data; address information recognition means for extracting and recognizing the address information data on the basis of the head position detection signal and for outputting the end position signal indicating the end position of the address information data; and recognition start signal generating means for counting the predetermined number of bytes starting from the end position of the address information data and ending at the head position of the subsequent address information data on the basis of the end position signal. The address information recognition means extracts and recognizes the address information data in accordance with the address information recognition start signal supplied from the recognition start signal generating means in a case where the head position detection signal is not supplied from the address mark detecting means thereto.

Therefore, even if some defect occurs on the address mark portion corresponding to the subsequent address information data, the header information detecting apparatus can extract and recognize the subsequent address information data when no defect is present in the preceding address information data and/or subsequent address information data so that recognition capability can be improved.

In the second and third embodiments, the following features are provided: sector mark detecting means for detecting the sector mark and outputting the detection signal when detecting the sector mark; address mark detecting means for detecting the address mark; address information detecting means for detecting the address information on the basis of the detected address mark and outputting the detection signal when detecting the address information; window signal generating means for generating and outputting a plurality of window signals whose time widths of the open states are mutually different; and window signal selecting means for selecting and outputting one of the window signals such that when the sector mark is detected, the window signal whose time width of the open state is relatively short (narrow) is supplied to the address mark detecting means and such that when the address information data are detected, one of the window signals whose time width of the open time is relatively short (narrow) is supplied to the address mark detecting means. The address mark detecting means executes the address mark detection operation only when the supplied window signal is in the open state.

Hence, according to the operations of the sector mark detection means and address mark detection means, the synchronization in time between the disc recording medium and detecting apparatus can accurately be determined and the open time width of the address mark detection window signal can be reduced so that the possibility of erroneous recognition of the address mark can be reduced.

Thus, the reading accuracy of the data on the magnetic disc recording medium can be improved.

In the fourth embodiment, the following features are provided: the sector mark detecting means for detecting the sector mark and outputting the sector mark detection signal when detecting the sector mark; first window signal generating means for generating the first window signal which is in the open state at a point of the predicted head position of the sector mark and is in the closed state in response to the sector mark detection signal derived from the sector mark detecting means; address information detecting means for detecting the address information data from the header portion of each sector and outputting the detection signal when the address information data are detected; second window signal generating means for generating the second window signal which is in the open state during the detection interval of the address information data; third window signal which is in the closed state; and third window signal generating means for generating a third window signal which is in the open state when the first window signal is in the open state and the second window signal is in the open state. The sector mark detecting means enables the detection of the sector mark when the third window signal is in the open state so that the detection operation of the sector mark is executed only in the region wherein the sector mark can be present.

Therefore, such a situation as the erroneous recognition of the data in the region in which the sector mark cannot be present as the sector mark can be avoided.

Of course, that all of the first, second, (or third), and fourth embodiments may be combined to form the header information detecting apparatus for detecting each sector mark, address marks, and address information data.

In the way described above, according to the present invention, the reading accuracy of data on the disc recording medium can be improved.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. An apparatus for detecting header information of a plurality of sectors recorded on a disc recording medium, the header information being recorded on each sector of the disc recording medium and being constituted by a sector mark indicating a head position of the corresponding sector, a plurality of address marks and address information data, said apparatus comprising:

a) sector mark detecting means for detecting the sector mark of each sector and outputting a sector mark detection signal when detecting the sector mark;

b) address mark detecting means for detecting each address mark;

c) address information data detecting means for detecting each address information data on the basis of the detected address mark and outputting a detection signal indicating that the address information data is detected;

d) plural window signals generating means for generating a plurality of window signals whose time widths in their open states are different from one another; and e) window signal selecting means for selectively outputting one of the window signals to the address mark detecting means such that when the sector mark is detected, one of the window signals whose time width in an open state is relatively narrower than any of the other window signals is selected and when the address information data is also detected, one of the window signals whose time width in the open state is narrower than any other window signals is selected, said address mark detecting means being supplied with the selected window signal and executing the detection operation of the address mark only when the selected window signal is in the open state.

2. An apparatus for detecting header information of a plurality of sectors recorded on a disc recording medium as set forth in claim 1, wherein there are two address marks AM1, AM2 and two address information data AD1, AD2 in each sector and said plural window signals generating means includes three window signals generating means for generating a first widest window signal having a first predetermined time width of the open state, generating a second window signal having a second predetermined time width which is less than the first predetermined time width, and generating a third window signal whose time width is less than the second predetermined time width and wherein when said sector mark detecting means does not detect the sector mark, the first window signal is selected as an address mark detection first window of the address mark detecting means, when said sector mark detecting means detects the sector mark the second window signal is selected as the address mark detection first window, when the address information data detecting means does not detect the address information AD1, the second window signal is selected as the address mark detection second window of the address mark detecting means, and when the address information data detecting means detects the address information data AD1, the third window signal is selected as the address mark detection second window.

3. An apparatus for detecting header information of a plurality of sectors recorded on a disc recording medium as set forth in claim 1, wherein said three address marks and three address information data, AM1, AM2, AM3, and AD1, AD2, AD3, respectively, for each sector and said plural window signals generating means includes three window signals generating means for generating a first window signal having a first predetermined time width, generating a second window signal having a second predetermined time width which is less than the first predetermined time width, and generating a third window signal whose time width is less than the second predetermined time width and wherein when said sector mark detecting means does not detect the sector mark, the first window signal is selected as an address mark detection first window of the address mark detecting means, when said sector mark detecting means detects the sector mark, the second window signal is selected as the address mark detection first window, when the address information data detecting means does not detect the address information AD1, the second window signal is selected as the address mark detection second window of the address mark detecting means, when the address information data detecting means detects the address information data AD1, the third window signal is selected as the address mark detection second window, when the address mark detecting means does not detect the address information data AD2, the second window signal is selected as the address mark detection third window, and when the address mark detecting means does not detect the address information data AD2, the third window signal is selected as the address mark detection third window.

* * * * *